Figure 1:
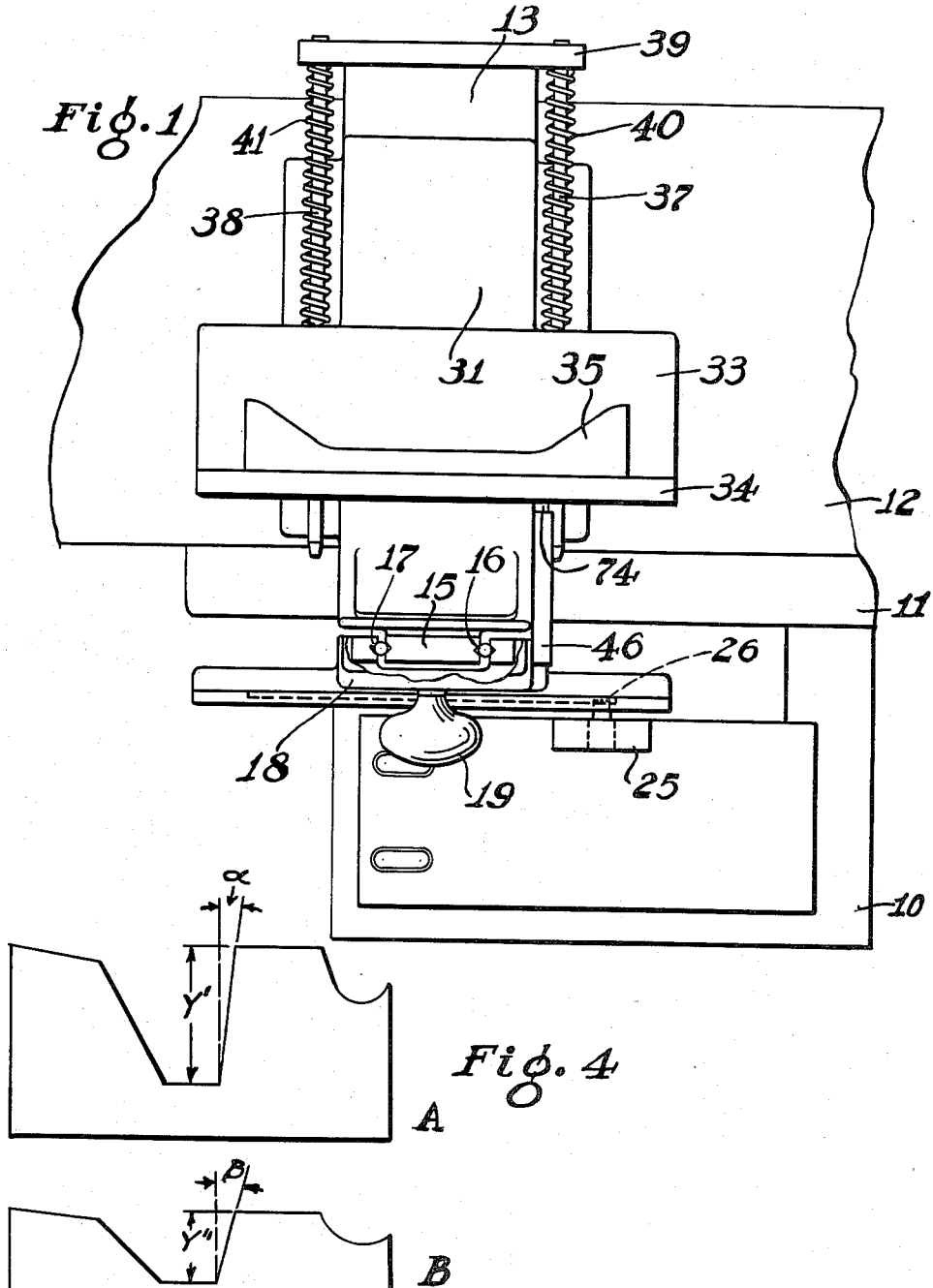

Jan. 31, 1956  N. HOGLUND  2,732,770
TEMPLET FORMERS

Filed July 30, 1952  3 Sheets-Sheet 2

INVENTOR.
*Nils Hoglund*
BY
*William A. Zalesak*
ATTORNEY

United States Patent Office 2,732,770
Patented Jan. 31, 1956

2,732,770

TEMPLET FORMERS

Nils Hoglund, Summit, N. J.

Application July 30, 1952, Serial No. 301,655

11 Claims. (Cl. 90—13.1)

My invention relates to apparatus for manufacturing templets or cams used for determining movement of tools such as cutting, grinding and milling tools, and particularly to apparatus for automatically obtaining distorted contour surfaces of templets or cams having conventional ratio relationships with respect to the contours to be formed on a workpiece.

In certain types of equipment, more specifically grinding wheel contour dressing apparatus such as described in my co-pending applications, Serial No. 173,419 filed July 12, 1950, now Patent No. 2,658,497 and Serial No. 271,255 filed February 12, 1952, now Patent No. 2,658,501, cams or templets are utilized for determining the movement of the dressing tool to form a predetermined contour on a grinding wheel. The cams are usually enlarged so that the cam contour is a reproduction of the contour to be ground but on a large scale, such as a ten to one ratio. In some cases the sharp angle on the contour surfaces on the cams make it difficult for the cam follower to follow the contour or climb the surface of the cam, thus placing great stress on the dressing apparatus. To reduce the strain and to facilitate smooth and even movement of the cam follower and dressing tool it is necessary to distort the cam surface to reduce the degree of angle followed by the stylus or cam follower. In order to provide such a distorted cam, it is necessary to resort to a great many computations and much layout work to determine the desired cam surface. Such work requires a great deal of time which may be several days for a complicated cam from the time the computations are started to the time of laying out and forming the cam in a milling machine, for example.

It is, therefore, an object of my invention to provide apparatus for manufacturing templets having distorted contours of templets having conventional ratio relationship with respect to the contour to be formed on a workpiece.

It is another object of my invention to provide such an apparatus which automatically eliminates the long and tedious computations and layout work previously required to form such distorted cam surfaces.

A still further object of my invention is to provide such apparatus which utilizes a conventional templet as a master templet to control the apparatus in automatically forming the distorted cam or templet.

A still further object of my invention is to provide such an apparatus which automatically transfers the contour from a master cam to the distorted cam with the desired degree of distortion of the contour surface in the templet formed by the apparatus.

Briefly, my invention comprises an apparatus having a movable table or first slide upon which is supported a base having a vertical extension. The vertical portion carries a second slide on which is supported the master cam. In operation this cam cooperates with a stationary stylus or templet follower. The second slide and master cam may be moved in a vertical direction in accordance with the cam contour as the slidable table or first slide is moved transversely of the templet follower which is fixed. Mounted on the base is a third slide movable transversely of the slidable table and second slide. This third slide carries a templet follower cooperating with a ratio cam mounted on the second slide. The third slide also carries a templet table upon which is mounted the blank from which the distorted cam is manufactured. Positioned above the templet table is a milling tool which may be moved in a vertical direction toward and from the table for forming the required contour on the cam as the cam blank moves longitudinally with the table and transversely of the table. That is, as the first slide or slidable table moves along its bed the second slide, mounted for vertical movement and carrying the master templet, moves in accordance with the contour of the master cam. In doing so the ratio cam carried by the second slide contacting the templet follower on the third slide carrying the blank of the templet to be formed is caused to move transversely of the table as the table moves along its bed beneath the milling tool, which is fixed, except for vertical movement, to cut or form the distorted contour on the blank.

Figure 2:
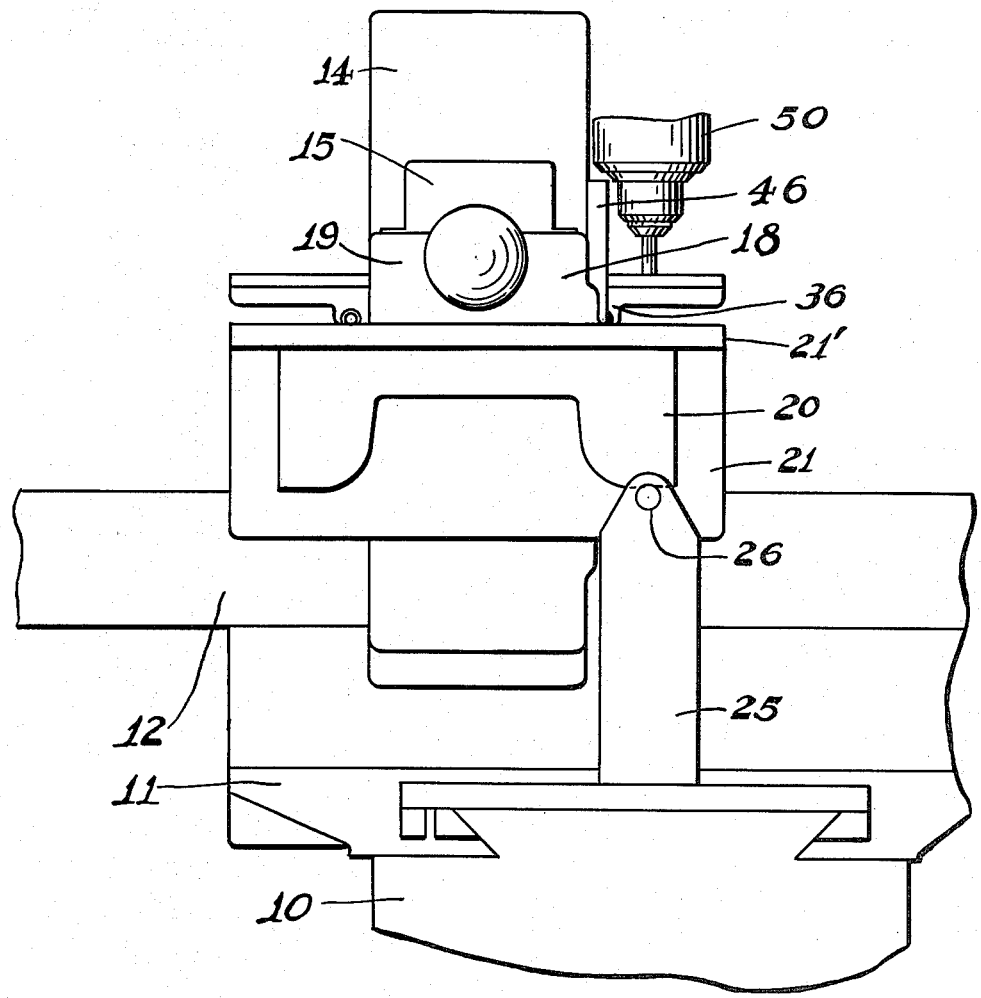
Figure 3:
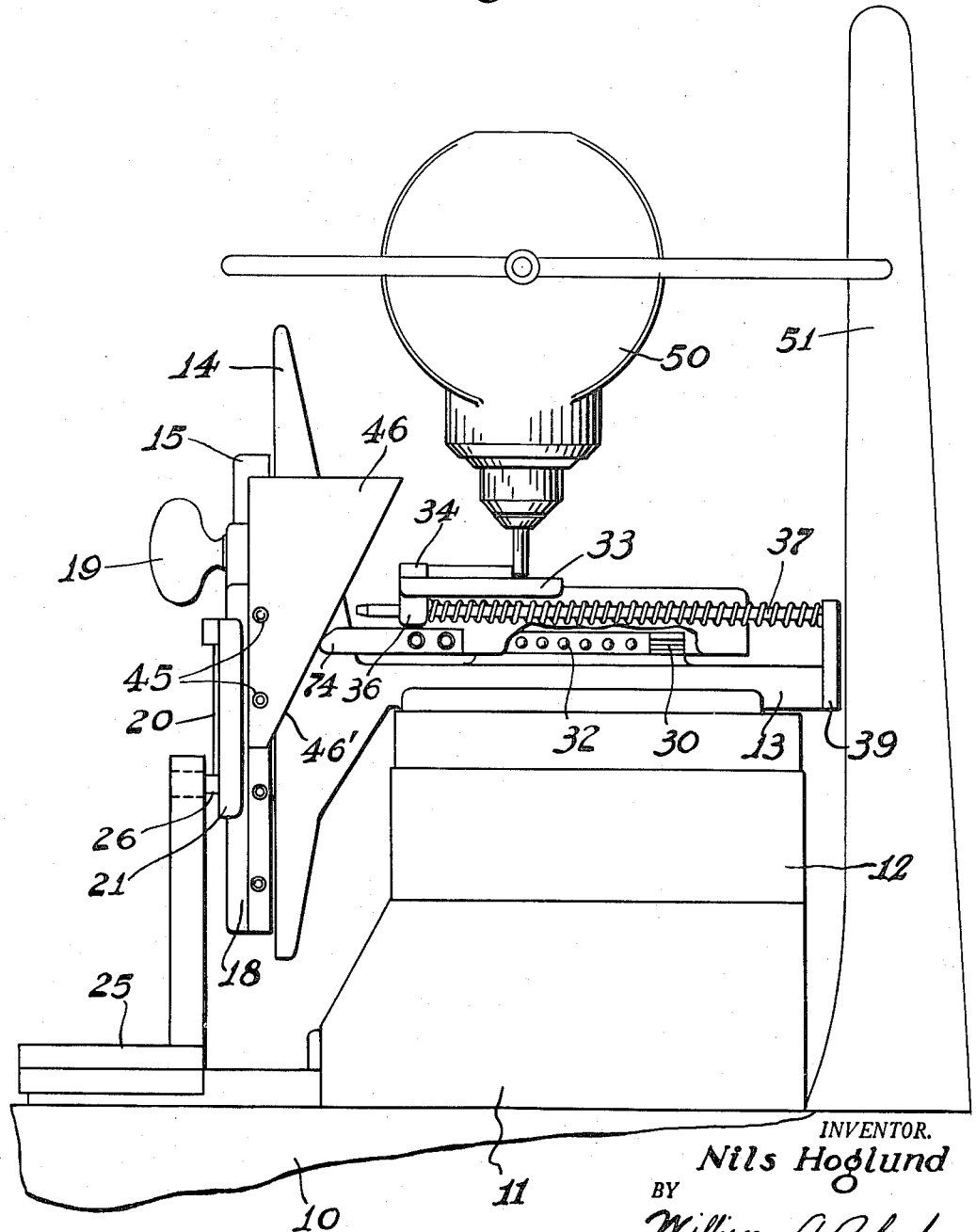

In the drawings Figure 1 is a plan view of an apparatus made according to my invention, Figure 2 is a front elevation and Figure 3 is a side elevation of apparatus made according to my invention, Figure 4 shows a master cam having a predetermined ratio with respect to the contour to be formed on a workpiece, and Figure 5 is a cam corresponding to the one shown in Figure 4 but having a distorted contour made on an apparatus made according to my invention.

Apparatus made according to my invention includes a base 10 which may be a milling machine knee to which apparatus made according to my invention may be attached. Mounted for movement along the base is a cross slide 11 supporting a slide or slidable table 12 movable transversely of the cross slide. Strapped to the slide or table 12 is a base support 13 having a vertical extension 14. The base support 13 carries a pair of slides, one 18 movable in a vertical direction and the other 31 horizontally and transversely of the slide 12. The vertically movable or second slide supports the master cam 20 and the transversely movable or third slide is mounted for movement in a horizontal plane and carries a blank 35 which is to be formed into the distorted cam.

The vertical extension 14 has mounted thereon the slide guide 15 which slidably supports for vertical movement by means of the ball bearing assemblies 16 and 17 a slide 18 provided with the handle 19 for permitting an operator to control the movement of the slide in a manner to be described. This vertically movable slide carries the master templet 20 which is mounted on the master templet table 21. The slide may be secured in any convenient manner, for example by screws, and abuts the shoulder 21¹ of the table 21.

Mounted on slide 11 and fixed thereto is the templet follower or stylus 26 which contacts the contour edge of the master templet 20. It will be seen that as the templet table 21 and templet 20 are moved transversely of the stylus 26 and pressure exerted on the handle 19 that the slide 14 will move up and down in accordance with the contour of the cam.

Mounted on the base support 13 is a slide guide 30 slidably supporting a slide 31 on ball bearing assemblies, such as 32, by means of a structure similar to that of slide 15. The slide 31 carries a templet table 33 having a shoulder 34 against which the blank 35 abuts, the blank being secured to the table in any desired fashion, for example, by screws. The slide 31 is provided with an overhang 36 through which spring support rods 37 and 38 slidably extend, the rods being fixed in member 39 mounted on support 13. A pair of compression springs 40 and 41 are supported by these rods and are maintained under compression between members 39 and 36 to urge the slide 31 towards slide 18.

A ratio cam or templet 46 is fixed to slide 18 by means of screws 45. The inclined surface of templet 46 is contacted by the templet follower or stylus 74, which is fixed to slide 31.

As the milling machine table is moved along its ways and as the slide 18 moves in a vertical direction as determined by the master cam 20 and stylus 26, the ratio cam moves therewith, and the follower moving along the inclined surface moves slide 31 in accordance with the movement of cam 46. The degree of movement of slide 31 with respect to slide 15 is determined by the angle of inclination of inclined surface $46^1$ on cam 46. The more acute the angle the less the movement of slide 31 and the more obtuse the angle on the working cam 35, one angle resulting in a 1 to 1 ratio producing no distortion in the blank when formed.

As shown, the milling tool 50 is in position above the templet and is supported by support column 51. It can be moved downwardly in a vertical direction to contact edge of the cam 35 to cut or form the contour in a distorted form in comparison with the contour of the master cam 20. The tool may also be stationary and the supporting table be moved up or down toward or away from the milling tool.

In order to better understand my invention, reference may be had to Figures 4 and 5. In the apparatus described in my copending applications the templet or cam controlling the movement of the cutting tool may be an enlarged reproduction of the surface to be formed. In the example shown, the cam has a ten to one ratio with respect to the surface to be formed. The angle alpha indicates a sharp angle which a stylus must climb and which puts the apparatus under great stress. Figure 5 represents a cam which is reproduced from the master cam shown in Figure 4 when formed from a blank and made on apparatus made according to the present invention. In the templet shown in Figure 4, the ratio of the contour dimensions in both directions is a ten to one ratio, whereas in Figure 5 the cam B still maintains a transverse dimension of ten to one but a radial or vertical dimension which has been reduced to a ratio of five to one with a corresponding change in the angular displacement so that angle alpha becomes angle beta. As a result the angle of climb has been made more obtuse with the vertical movement of apparatus with which the templet is to be used.

Thus the distorted contour is quickly, accurately and automatically reproduced on the working template by means of my apparatus.

I claim:

1. Apparatus for automatically forming a working templet from a master templet and including a support, a first slide movable in one direction along said support, a second slide mounted on said first slide for movement transversely of the movement of said first slide, and a third slide on said first slide movable transversely of the movement of said second and first slides, said second slide being adapted to support a working templet blank to be formed, said third slide adapted to support a master templet, a templet follower fixed to said support and adapted to contact the contour of said master templet, and a ratio cam and cam follower connecting said second and third slides for controlling movement of said second slide by said third slide, and a forming tool mounted adjacent said second slide and having relative movement therewith to contact said working templet to form the contour thereon as said second slide and working templet move relative to said forming tool.

2. Apparatus for automatically forming a working templet having a distorted contour from a master templet and including a support, a slidable member movable in one direction along said support, a first slide mounted for movement transversely of the movement of said slidable member, and a second slide on said slidable member movable transversely of the movement of said first slide, a forming tool mounted adjacent said support, said first slide being adapted to support a working templet blank to be formed adjacent said forming tool, said second slide being adapted to support a master templet, a templet follower fixed to said support and adapted to contact the contour of said master templet, and a ratio cam and cam follower connecting said first and second slides for controlling movement of said first slide by said second slide with respect to said slidable member and forming tool to form the distorted contour on said working templet blank.

3. Apparatus for automatically forming a working templet having a distorted contour from a master templet and including a support, a slidable member movable in one direction along said support, a first slide mounted for movement transversely of the movement of said slidable member, and a second slide on said first slide movable transversely of the movement of said slidable member and first slide, said first slide having means to support a working templet blank to be formed in a horizontal plane, said second slide adapted to support a master templet for movement in a vertical plane, a templet follower fixed to said support and adapted to contact the contour edge of said master templet to control vertical movement of said second slide, and a ratio cam and cam follower connecting said first and second slides for controlling movement of said first slide in a horizontal plane by said second slide and a forming tool mounted above said first slide and having relative movement with respect to said first slide to contact said working templet blank to form the distorted contour on said blank.

4. Apparatus for forming a working templet from a master templet and comprising a support and at table movable along said support, a supporting member mounted on said table and having a vertical extension, a slide mounted for vertical movement on said extension and carrying a templet support adapted to support a master templet and a fixed templet follower mounted on said support for contacting said master templet, a second slide mounted on said supporting member and movable toward and from said first slide and transversely of said movable table, a templet support on said second slide for receiving and supporting a blank from which a working templet can be made, a ratio cam mounted on said first slide and having an inclined surface, and a cam follower mounted on said second slide and engaging said inclined surface, and resilient means positioned between said second slide and said supporting member for urging said second slide and cam follower into contact with said ratio cam, and a cutting tool mounted above said second slide for forming a contour on said blank.

5. Apparatus for forming a working templet having a distorted contour and comprising a support and a table movable along said support, a supporting member mounted on said table and having an extension, a first slide mounted for movement on said extension and carrying a templet support adapted to support a master templet and a fixed templet follower mounted on said support for contacting said master templet to control movement of said first slide, a second slide mounted on said supporting member and movable toward and from said first slide and transversely of said movable table, a templet support on said second slide for receiving and supporting a blank from which a working templet can be made, a ratio cam mounted on one of said slides and having an inclined surface, and a cam follower mounted on said other of said slides and engaging said inclined surface, and resilient means positioned between said second slide and said supporting member for urging said second slide and cam follower into contact with said ratio cam, and a cutting tool mounted adjacent said second slide for forming a contour on said blank.

6. Apparatus for forming a working templet having a distorted contour from a master templet and comprising a support and a table movable along said support, a first slide mounted for vertical movement on said table and carrying a templet support adapted to support a master templet, and a fixed templet follower mounted on said support for contacting said master templet for controlling vertical movement of said first slide, a second slide mounted on said table and movable toward and from said first slide and transversely of said movable table, a templet support on said second slide for receiving and supporting in a horizontal plane a blank from which a working templet can be made, a ratio cam mounted on said first slide and having an inclined surface, and a cam follower mounted on said second slide and engaging said inclined surface, and resilient means positioned between said second slide and said table for urging said second slide and cam follower into contact with said ratio cam, and a cutting tool mounted above said second slide for forming a contour on said blank.

7. Apparatus for forming a working templet from a master templet and comprising a support and a table movable along said support, a supporting member mounted on said table and having an extension, a first slide mounted for movement on said extension and carrying a templet support adapted to support a master templet and a fixed templet follower mounted on said support for contacting said master templet, a second slide mounted on said supporting member and movable toward and from said first slide and transversely of said movable table, a forming tool mounted adjacent said support a templet support on said second slide for receiving and supporting adjacent said forming tool a blank from which a working templet can be made, a ratio cam mounted on one of said slides and having an inclined surface, and a cam follower mounted on the other slide and engaging said inclined surface, and resilient means positioned between one of said slides and said supporting member for urging said second slide and cam follower into contact with said ratio cam for controlling movement of said second slide and the blank supported thereby relative to said forming tool for forming a contour on said blank.

8. Apparatus for forming a working templet having a distorted contour and comprising a support and a table movable along said support, a supporting member mounted on said table and having a vertical extension, a first slide mounted for vertical movement on said extension and carrying a templet support adapted to support a master templet and a fixed templet follower mounted on said support for contacting said master templet, a second slide mounted on said supporting member and movable toward and from said first slide and transversely of said movable table, a templet support on said second slide for receiving and supporting a blank from which a working templet can be made, a ratio cam mounted on said first slide and having an inclined surface, and a cam follower mounted on said second slide and engaging said inclined surface and resilient means positioned between said second slide and said supporting member for urging said second slide and cam follower into contact with said ratio cam, and a cutting tool mounted above said second slide and for forming a contour on said blank, said first slide having a handle thereon for manually urging said first slide and a master templet thereon against and in contact with said templet follower, said first and second slides having shoulders for determining the position of the master templet and working templet.

9. Apparatus for forming a working templet having a distorted contour from a master templet and comprising a support and a table movable along said support, a supporting member mounted on said table and having an extension, a first slide mounted for movement on said extension and carrying a templet support adapted to support a master templet and a fixed templet follower mounted on said support, a second slide mounted on said supporting member and movable toward and from said first slide and transversely of said first slide, a templet support on said second slide for receiving and supporting a blank from which a working templet can be made, a ratio cam mounted on one of said slides and having an inclined surface, and a cam follower mounted on the other slide and engaging said inclined surface and resilient means positioned between one of said slides and said supporting member for urging said second slide and cam follower toward said ratio cam, and a forming tool mounted adjacent said second slide for forming a contour on said blank, said first slide having a handle thereon for manually urging said first slide and a master templet thereon against and in contact with said fixed templet follower, said first and second slides having shoulders for determining the position of the master templet and working templet blank.

10. Apparatus for forming a working templet from a master templet and adapted for use with a support having a table movable along said support and a cutting tool mounted adjacent said support, and including a supporting member to be mounted on said table and having an extension, a first slide mounted for movement on said extension and carrying a templet support adapted to support a master templet, said support having a fixed templet follower mounted thereon for contacting said master templet to control movement of said first slide, a second slide mounted on said supporting member and movable toward and from said first slide and transversely of said movable table, a templet support on said second slide for receiving and supporting a blank from which a working templet can be made, a ratio cam mounted on one of said slides and having an inclined surface, and a cam follower mounted on said other of said slides and engaging said inclined surface, and resilient means positioned between one of said slides and said supporting member for urging said second slide and cam follower into contact with said ratio cam, said second slide being adapted for mounting adjacent said cutting tool for forming a contour on said blank.

11. Apparatus for forming a working templet having a distorted contour from a master templet and including a movable support, a first slide mounted for vertical movement on said movable support and carrying a templet support adapted to support a master templet for contacting a fixed templet follower for controlling vertical movement of said first slide, a second slide mounted on said movable support and movable toward and from said first slide and transversely of said movable support, a templet support on said second slide for receiving and supporting in a horizontal plane a blank from which a working templet can be made, a ratio cam mounted on said first slide and having an inclined surface, and a cam follower mounted on said second slide and engaging said inclined surface, and resilient means positioned between one of said slides and said movable support for urging said second slide and cam follower into contact with said ratio cam, a cutting tool mounted adjacent said movable support, said second slide being mounted adjacent said cutting tool for forming a contour on said blank.

References Cited in the file of this patent
UNITED STATES PATENTS

| | | |
|---|---|---|
| 2,059,505 | Wright | Nov. 3, 1936 |
| 2,333,985 | Clark | Nov. 9, 1943 |
| 2,551,953 | Larson | May 8, 1951 |